United States Patent [19]

Chasson

[11] 4,188,544
[45] Feb. 12, 1980

[54] METHOD AND APPARATUS FOR AUTOMATICALLY PROCESSING A WORKPIECE EMPLOYING CALIBRATED SCANNING

[75] Inventor: Leon H. Chasson, Los Altos Hills, Calif.

[73] Assignee: Weyerhaeuser Company, Tacoma, Wash.

[21] Appl. No.: 826,554

[22] Filed: Aug. 22, 1977

[51] Int. Cl.² .................... G01B 11/00; G01N 21/30
[52] U.S. Cl. .................................. 250/560; 144/312; 250/571; 250/223 R; 250/224; 356/376; 358/107
[58] Field of Search .............. 250/222 R, 223 R, 224, 250/234–236, 548, 559, 560, 561, 571; 356/120, 156–160, 167, 168, 376; 144/3 R, 312; 358/107

[56] References Cited
U.S. PATENT DOCUMENTS

| | | | |
|---|---|---|---|
| 3,187,185 | 6/1965 | Milnes | 250/222 R |
| 3,773,422 | 11/1973 | Stavis et al. | 356/156 |
| 3,854,822 | 12/1974 | Altman et al. | 356/156 |
| 3,890,509 | 6/1975 | Maxey | 144/312 X |
| 4,086,496 | 4/1978 | Berry | 250/561 |

Primary Examiner—Siegfried H. Grimm
Attorney, Agent, or Firm—Limbach, Limbach & Sutton

[57] ABSTRACT

A system for efficiently scanning and processing a workpiece, particularly logs or pieces cut from logs, wherein the workpiece is first scanned by projecting at least one plane light source at a first angle and detecting the intersection line of the plane of light and workpiece at a second angle. Signals representing points on the intersection line are corrected to compensate for errors in the scanning apparatus to generate signals representing spatial coordinates of the workpiece at the intersection line. The spatial coordinate representing signals are analyzed to generate processing control signals for controlling devices acting on the workpiece, such as automatic sawing equipment.

26 Claims, 17 Drawing Figures

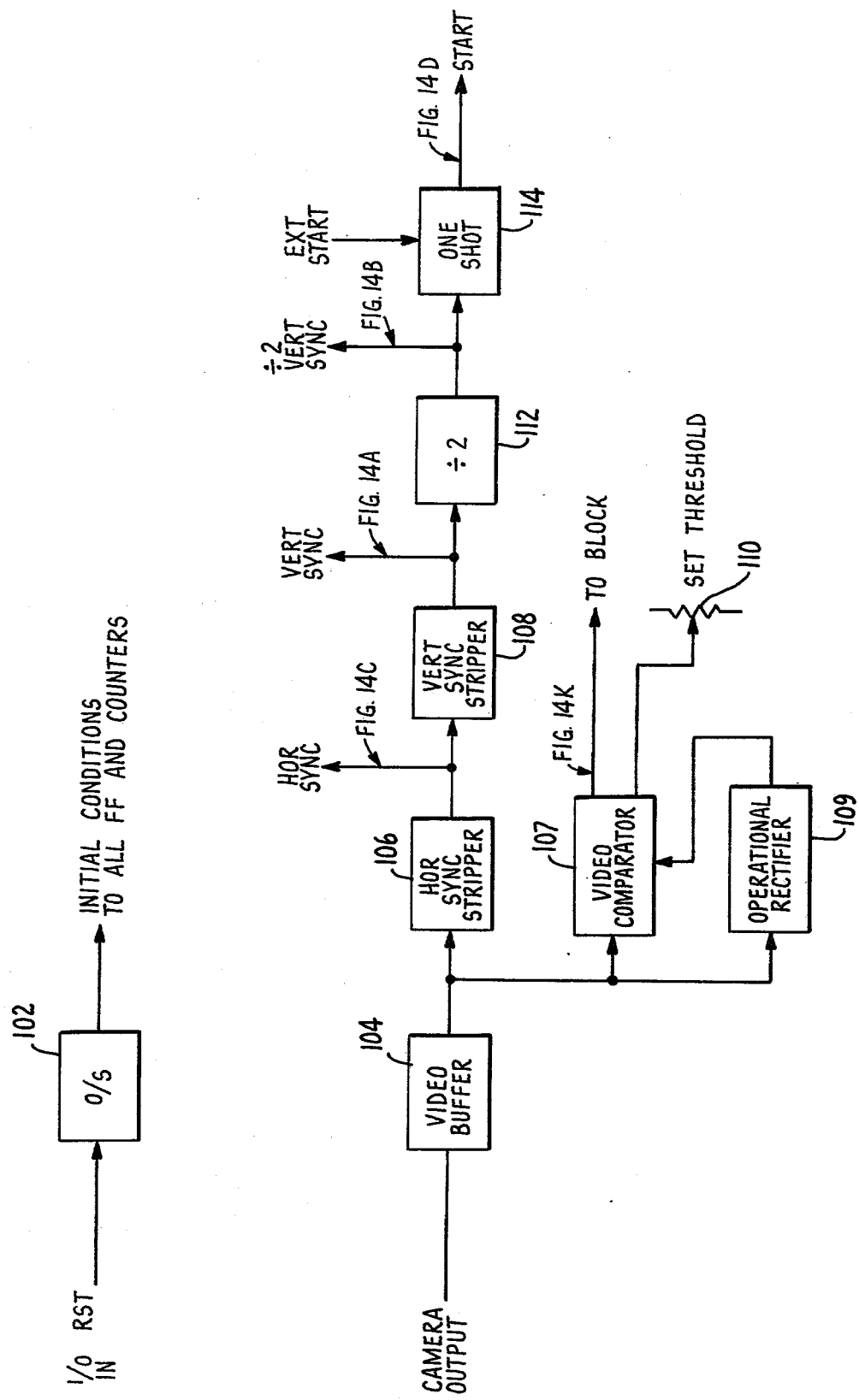

4,188,544

METHOD AND APPARATUS FOR AUTOMATICALLY PROCESSING A WORKPIECE EMPLOYING CALIBRATED SCANNING

BACKGROUND OF THE INVENTION

The present invention relates to a method and apparatus for the scanning and processing of workpieces, particularly logs and pieces cut from logs. More particularly, the invention is related to a method and apparatus for the processing of workpieces wherein highly accurate workpiece spatial coordinate information is obtained. Although the invention will be described in connection with the processing of logs or pieces cut from logs, the invention is also applicable to the processing of other types of workpieces, such as in the fabrication of metal workpieces in rolling mills.

A continuing problem in the lumber and plywood industry is the processing of logs to obtain the maximum amount of salable wood products from each log, particularly with regard to the determination of how a log should be optimally divided. Many modern lumber mills now employ some type of automatic scanning equipment which feeds information regarding log, cant, flitch or board dimensions to a data processing device which in turn analyzes the dimensional data to control cutting mechanisms.

A problem in such automatic cutting systems is the provision of continuously accurate workpiece dimensional or spatial coordinate data to the data processing device. Such automatic systems must be operable in the relatively hostile environments of wood products manufacturing facilities subject to temperature fluctuations, moisture and dust. Moreover, the data accuracy is preferably not dependent on continued operator adjustments to the system.

Prior art systems have used a variety of electro-optical techniques for scanning workpieces in automatic cutting systems. One type of such systems has employed a non-coherent light source and photocell sensors either in a fixed array or scanning by means of a rotating mirror. Exemplary of such systems are U.S. Pat. Nos. 3,459,246 (Ottosson); 3,736,968 (Mason); 3,787,700 (Chasson); 3,886,372 (Sanglert) and 3,963,938 (Sanglert).

In U.S. Pat. No. 3,773,422 to Stavis et al, a television camera and laser source are used for calculating dimensions of an object by using known distances and geometric relationships.

U.S. Pat. No. 3,187,185 to Milnes discloses a primarily photographic system for determing the surface contour of an object by viewing the object at an angle from the illuminating light beam. A similar system, using a television camera is set forth in U.S. Pat. No. 3,590,258 to Shibata. Another contour observing system using a light beam and sensor at a separated angle is set forth in U.S. Pat. No. 3,625,618 to Bickel.

Distances to points on an object can be measured by the technique in U.S. Pat. No. 3,610,754 (Perlet), wherein the distance is measured by directing a pulsed laser beam toward the object and measuring the time lapse until the laser illuminated point is received by a television camera.

All of the above patents in their entirety are hereby incorporated by reference.

One problem with prior art systems employing photoelectric cells or other types of solid state sensors is that resolution is relatively poor unless extremely large numbers of sensors are employed. The present cost of such devices makes such a choice unattractive for commercial applications.

In prior art systems employing television type sensors, as well as photoelectric or solid state sensors, accuracy of the readout is a problem due to drifting of the devices caused by component aging, environmental factors and such. Also geometric distortions in the camera or lenses create errors.

A further problem, nut fully addressed by the prior art, is the generation of accurate data by automatic scanning in such a form as to be readily usable by a data processing device for conversion to control signals for automatically processing the workpiece.

It is a general object of the present invention to overcome the disadvantages of the prior art in a system for automatically scanning and processing a workpiece.

It is also a general object of this invention to provide in such a system, a high resolution scanning apparatus and method in which errors in the scanning apparatus are automatically corrected.

Another object of the invention is to provide a method and means for generating signals relating to the dimensions of a workpiece in a form readily handled by data processing equipment.

A further object of the instant invention is to provide a method and means for the accurate processing of workpieces, particularly the accurate dividing of logs or slabs, cants, flitches and boards cut from logs.

Yet a further object is the provision of an automatic workpiece processing system in which the physical relationships among the scanning devices and workpieces are not critical.

These and other objects of the invention will be appreciated as the following description of the preferred embodiment of the invention, and accompanying drawings, are read and understood.

BRIEF DESCRIPTION OF THE DRAWINGS

FIG. 2b is a plan view of a workpiece illuminated by the apparatus of FIG. 2a.

FIG. 13A is a block diagram of the preprocessor of FIG. 3.

DESCRIPTION OF THE PREFERRED EMBODIMENTS

Figure 1:
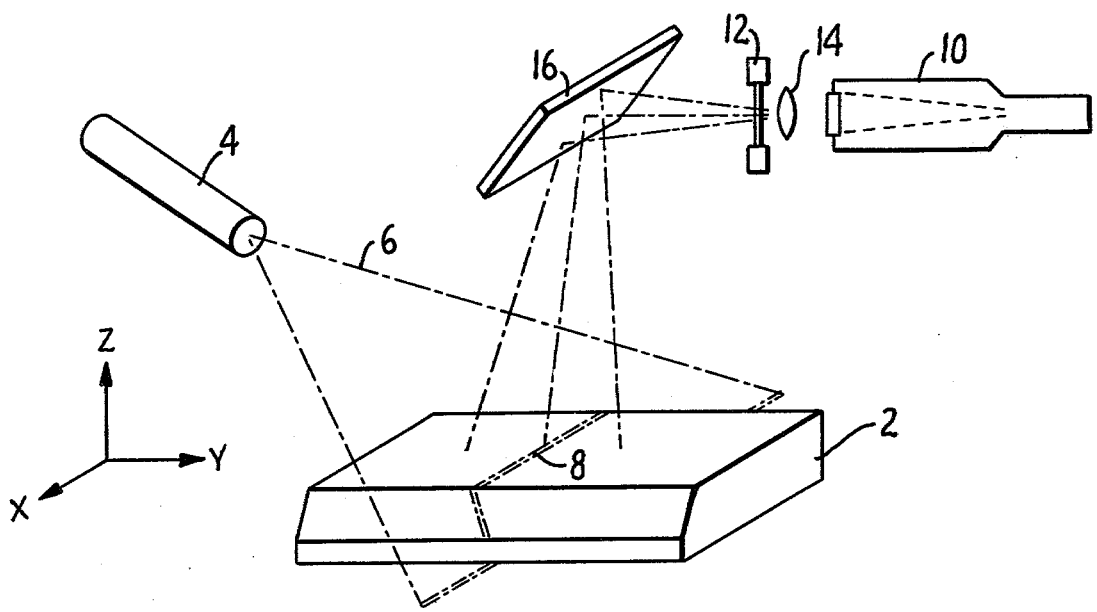
FIG. 1 is a diagrammatic perspective view of one method of illuminating and detecting the illumination of a stationary or longitudinally moving workpiece, forming a part of the scanning operation according to the present invention.

Simplified illumination and detection apparatus of the type suitable for use as a part of the scanning operation of the present invention is shown in FIG. 1. The invention requires illumination and detection apparatus in which a plane of detectable energy is directed at a workpiece at a first angle to generate an intersection line viewed by a detector directed at the workpiece from a second angle. Such illuminators/detectors thereby convert the depth dimension of a three-dimensional object to a dimension in a two-dimensional system, i.e.—the z coordinate in an x, y, z coordinate three-dimensional system is converted to the y coordinate in a two-dimensional system, thus permitting the use of a two-dimensional detection system. In other words, workpiece thickness is related to the apparent intersection line position. The relation is one-to-one for the 45° angle case. Thus workpiece profile is transformed to apparent intersection line deviations representing spatial coordinates of the workpiece.

In FIG. 1, a board of wood 2 having at least one wane edge is shown illuminated by a laser source 4 directing a thin plane of light 6 at about a 45° angle to the plane of the board. Although a laser source is preferred, other types of detectable energy sources may be used within the teachings of the invention. The laser beam is spread into a thin plane of illumination 6 by a cylindrical lens (not shown). A helium neon laser operating in the $TEM_{oo}$ mode and having about 1 to 7 milliwatts power has been found suitable, although a multi-mode laser with more elaborate optics could be used. The laser and optics described generate a diverging plane of light having divergence of about one milliradian which results in a width of about 0.12 inch at 10 feet. The central 20 inches of the light plane is used, which is about one-third of the plane width at 10 feet. Within the requirements to provide a narrow high intensity plane of light, other types of illumination may be used.

Figure 4:
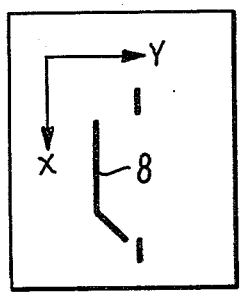
FIG. 4 is a representation of a television raster resulting from the field of view of the camera of FIG. 1.

The intersection of the incident laser light plane 6 and the board surface generates an intersection line 8 which appears as a bent line when viewed from an angle different from the angle of incidence of the laser light plane 6. Detection of the intersection line is provided by a television vidicon camera 10 having an interference filter 12 and lens 14. A television raster depicting the intersection line as viewed by camera 10 is shown in FIG. 4. Mirror 16 permits the camera to be mounted horizontally, for convenience. The effective viewing angle with respect to the plane of the board 2 is 90°. The preferred angle between the illuminator and detector is 45° for maximum signal-to-noise ratio, however, the angle is not critical to the operation of the inventive system. Zero degrees and 90° set obvious extreme boundaries on the difference angle. Thirty to sixty degrees are considered as practical limits due to rapidly decreasing signal-to-noise ratio beyond those angles. However, in some systems, where the workpiece geometry is relatively invariant, ambient light is low and/or if board accuracy can be tolerated, angles close to the extreme boundaries may be usable.

Ambient light is reduced by the interference filter 12 which is a band pass filter substantially centered at the frequency of the laser source 4.

The television camera should have sufficient dynamic range to handle amplitude variations in the order of 50 to 1 caused by wood coloration, angle of illumination and detection incidence and/or brightness variations along the laser line. The camera should have good lag characteristics. High lag (the time it takes for an image to disappear electrically after it is removed from the field of view) may result in inaccurate data generation when scanning a moving workpiece.

Typically, a board requires scanning at more than one position along its length, although, for some purposes it may be sufficient to scan board 2 at a single stationary position relative to laser 4 and camera 10. With a single illuminator and detector as in FIG. 1, the board 2 will normally be transported longitudinally (along the y-axis) in order to permit detection of the laser intersection line at several positions along the board.

Depending on the board velocity and whether the board wane is varying significantly along the direction of board movement, it may be necessary to effectively "freeze" or slow the board motion by some means in order to permit detection of the laser intersection line. Such "freezing" or slowing is preferably done by means associated with the illuminator and/or detector rather than by affecting the board movement.

Several means for effectively slowing the board motion are possible: pulsing the laser source, mechanically shuttering the camera, or rotating mirror 16 to track the board movement.

The laser source can be pulsed by pulsing its power supply, for example. However, the effective laser energy is reduced thereby decreasing the signal-to-noise ratio of the illumination/detection system.

Mechanical shuttering of the camera can be accomplished by various well-known means and the shutter open periods can be less than the television frame time and yet produce a complete picture due to inherent vidicon camera characteristics. However, the energy received by the camera is again reduced. Also, high speed mechanical shutters are susceptible to relatively limited lifetimes.

The rotating mirror technique, which is well-known in the prior art, for example as in said U.S. Pat. No. 3,963,938, provides useful results for practical board velocities without reduction of detectable energy. Although the board motion is not "frozen," it is substantially slowed, resulting in an averaging of the board profile over a short time period.

Figure 2A:
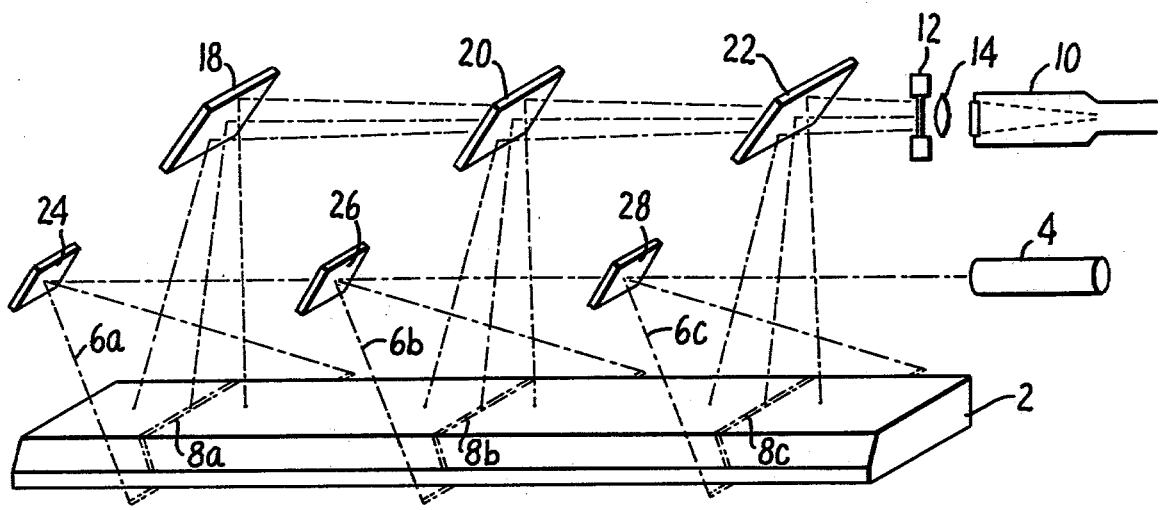
FIG. 2a is a diagrammatic perspective view of a method of illuminating and detecting the illumination of a stationary, transversely moving or longitudinally moving workpiece, forming a part of the scanning operation according to the present invention.
Figure 2B:
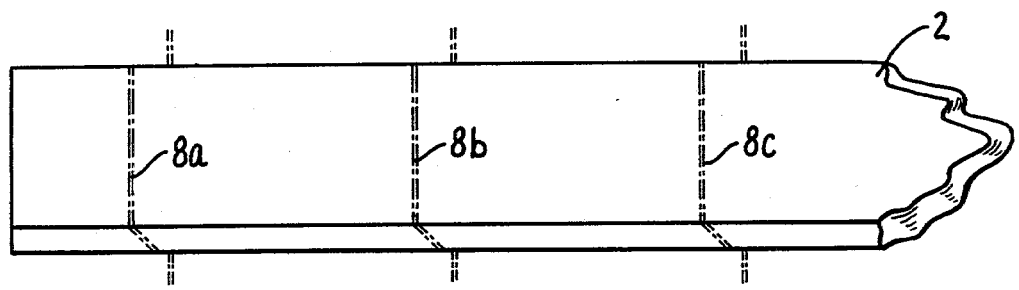

FIGS. 2a and 2b show an alternative to the illumination/detection arrangement of FIG. 1: A series of mirrors are used in connection with a single camera and a single laser source, respectively. Laser source 4 and lens (not shown) direct a plane of light onto partially-silvered mirrors 28 and 26 and full silvered mirror 24 to direct three spaced-apart planes of illumination 6a, 6b and 6c at board 2, resulting in three spaced-apart intersection lines 8a, 8b, and 8c, respectively, on board 2. The normal view of the three intersection lines on board 2 shown in FIG. 2b is reflected by full silvered mirror 18 and partially silvered mirrors 20 and 22 toward camera 10. In order to prevent the three lines from appearing congruent, the mirrors may be tilted so as to cause the lines, as seen by the camera, to be separated.

The arrangement of FIG. 2a permits scanning of stationary boards or those moving both transversely and longitudinally with respect to the board's major axis. Depending on the board velocity, a means for slowing the apparent velocity may be required, as discussed above.

Other alternatives to the scanning operation arrangements of FIGS. 1 and 2a will be apparent to those of ordinary skill in the art in view of the teachings herein. For example, multiple cameras and/or laser sources may be used to generate and detect multiple intersection lines. Also, opposite portions of a workpiece may be scanned by appropriately arranging illuminators and detectors. By using transparent or partly open transporting means even the under portion of a workpiece may be scanned.

As an alternative to television camera detection in the scanning operation, an array of solid state sensors could be used. Such an array could comprise a large matrix of fixed sensors in order to obtain high resolution or, alternatively, could comprise a line array and rotating mirror to scan the array field of view.

Figure 3:
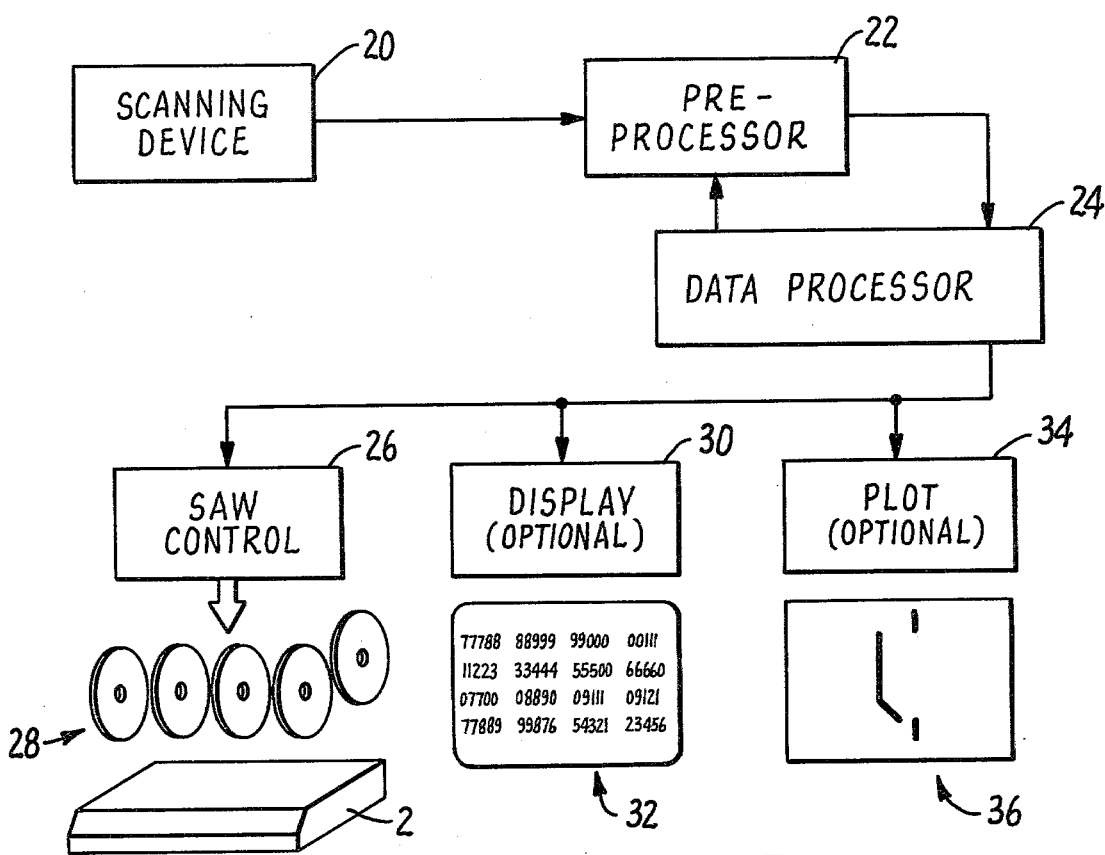
FIG. 3 is a partially diagrammatic block diagram of an automatic workpiece processing system embodying the present invention.

FIG. 3 shows an overall system block diagram incorporating a scanning arrangement of the type discussed above. The scanning device 20 output is applied to a preprocessor 22 which alters the signals from scanning device 20 to the extent necessary for compatibility with the data input requirements of data processor 24. In accordance with the preferred embodiment of the invention, the scanning device 20 output is a conventional analog composite television signal, the preprocessor 22 is an analog-to-digital converter type device, described in detail below, and the data processor 24 is a general purpose computer. The data processor 24 will, in general, communicate back to the preprocessor 22 in order to provide reset commands and the like.

Alternatively, if the scanning device output is other than an analog composite television signal, the preprocessor will be accordingly modified. It is intended that the data processor input includes a series of digital data signals representing points along laser intersection lines. Those of ordinary skill in the art will appreciate that preprocessor 22 will be accordingly modified from the embodiment set forth below for the cases where signals other than an analog television signal are provided by scanning device 20. For example, the scanning device output may be a digitized television signal or signals from an array of sensors.

Those of ordinary skill in the art will also appreciate that the functions of the preprocessor and general purpose digital computer may also be combined into a specialized purpose data processing means without departing from the teachings of the invention.

Referring again to FIG. 3, the data processor 24 output is a control signal suitable for application to the saw control 26 of an automatic saw system, shown diagrammatically at 28 with respect to board 2. The control signals will typically include an instruction as to saw position, and in some cases, saw angle.

Optionally, the data processor 24 output may be applied to a plotting device 34 which provides a television raster scan of the intersection line data shown diagrammatically at 36. An x-y plotter, or the like, could also be used with appropriate conversion means. The television plot could be taken from the data processor 24 output data by appropriate conversion means, or, alternatively, a television monitor could be connected directly to the scanning device 20 output in the case where a television camera is used as the scanning device detector.

As a further option, the data from data processor 24 can be displayed in its digital form on a CRT screen, shown diagrammatically at 32, when driven by an appropriate display converter 30.

The aforementioned options are likely to be most useful in setting up and adjusting the system rather than in normal operation where the displayed plot and data are likely to be changing so rapidly as to be unreadable by the human observer.

Figure 5:
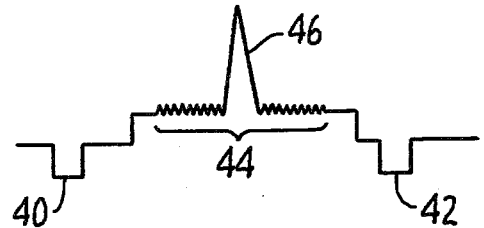
FIG. 5 is a representation of the signal amplitude of a horizontal scan line such as along the midportion of the raster of FIG. 4.

FIG. 5 shows the signal waveform of a single horizontal television line located roughly midway vertically in the raster of FIG. 4. Horizontal sync pulses are shown at 40 and 42. The analog signal along the horizontal scan is in the area 44 (the remaining waveform comprising the horizontal and other synchronizing signals). The analog signal is at a generally low level comprising ambient noise except for an amplitude pulse 46 caused by the laser intersection line.

Figure 6:
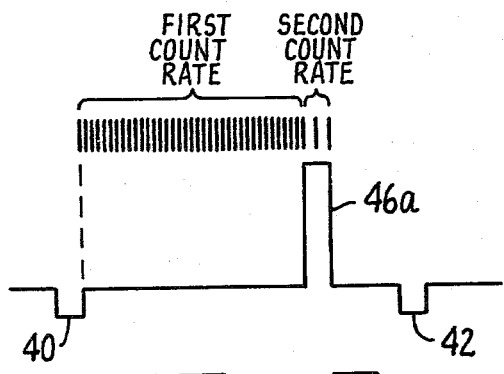
FIG. 6 is a diagrammatic representation of the counting technique used in the preprocessor of FIG. 3.

As depicted in FIG. 6, preprocessor 22 converts pulse 46 to a rectangular pulse 46a and counts at a first rate from the horizontal sync pulse to the leading edge of pulse 46a; it then counts at a second rate, half the first rate, until the trailing edge of pulse 46a. The resulting total count indicates closely the location of the peak of pulse 46 and the laser line 8 along the horizontal television line. The technique of using a half rate to count during pulse 46a removes threshold setting errors in converting pulse 46 to rectangular pulse 46a and avoids the problem of varying pulse width due to varying wood coloration and, in effect, provides a simple pulse peak detector. In the preprocessor described below an initial 20 MHz clock rate is used for counting, however, a 50 MHz rate will provide greater accuracy.

The television horizontal line number plus the count along the horizontal line thus define a point along the laser intersection line 8 as seen by the television camera. Thus the preprocessor generates addresses for points along the laser intersection line and functions as a specialized analog-to-digital converter. The preprocessor provides y-coordinate data and the data processor provides the x-coordinate data by counting the horizontal TV lines.

In a practical system, geometrical errors in the television scan, component aging, environmental factors, and the like, cause errors and distortions in the signals from the scanning device 20. Similar errors, along with a need to calibrate the scanning system, whatever its type, will occur in non-television scanning. The present invention therefore contemplates a means for self-calibrating the system so that data provided to the saw control is highly accurate. The calibration technique also eliminates any requirement to provide known physical relationships among the illuminator, detector and workpiece.

In function, the spatial signals from the scanning means are converted to processing control signals, the spatial coordinate signals being modified to correct for errors in the scanning means. The modifying means to correct for errors involves functions in the data processing system including its memory wherein correction factors are derived by comparing scanning signals from a known reference piece with previously stored spatial dimensions of the known reference piece.

In order to calibrate the system, a known reference piece is viewed by the scanning arrangement. The spatial coordinates of the reference piece are precisely known and stored in the data processor memory. When scanned, the points along the laser intersection line on the reference piece are compared to the stored data in order to define the relative dimensional value of the points. This technique, in effect, calibrates out inaccuracies in the scanner detection apparatus. If the known reference piece is located at a known position in the field of view, the dimensional values thus defined are absolute rather than relative. That is, a one inch reading is the actual value of the workpiece dimension. In the relative case, a one inch reading is not the actual dimension and would be meaningful only as a differential dimension with respect to another dimension on the board.

Figure 7:
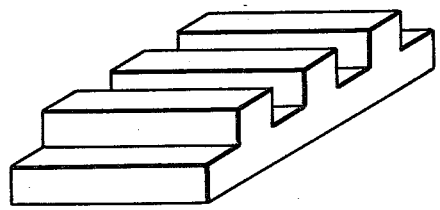
FIG. 7 is a perspective view of a reference workpiece useful in calibrating the system of FIG. 3.

One type of reference calibration fixture is shown in FIG. 7. The possible configurations of such fixtures is virtually limitless.

In practice, the known reference can be placed in the field of view of the scanner manually at periodic intervals, such as once daily when the system is first placed into operation. However, more frequent calibration may be desirable and a reference fixture could be arranged so as to be in the field of view whenever a workpiece is not in the field of view, thus providing continual system calibration. Alternatively, continuous system calibration can be provided by locating a reference fixture at the periphery of the workpiece field of view.

Figure 8:
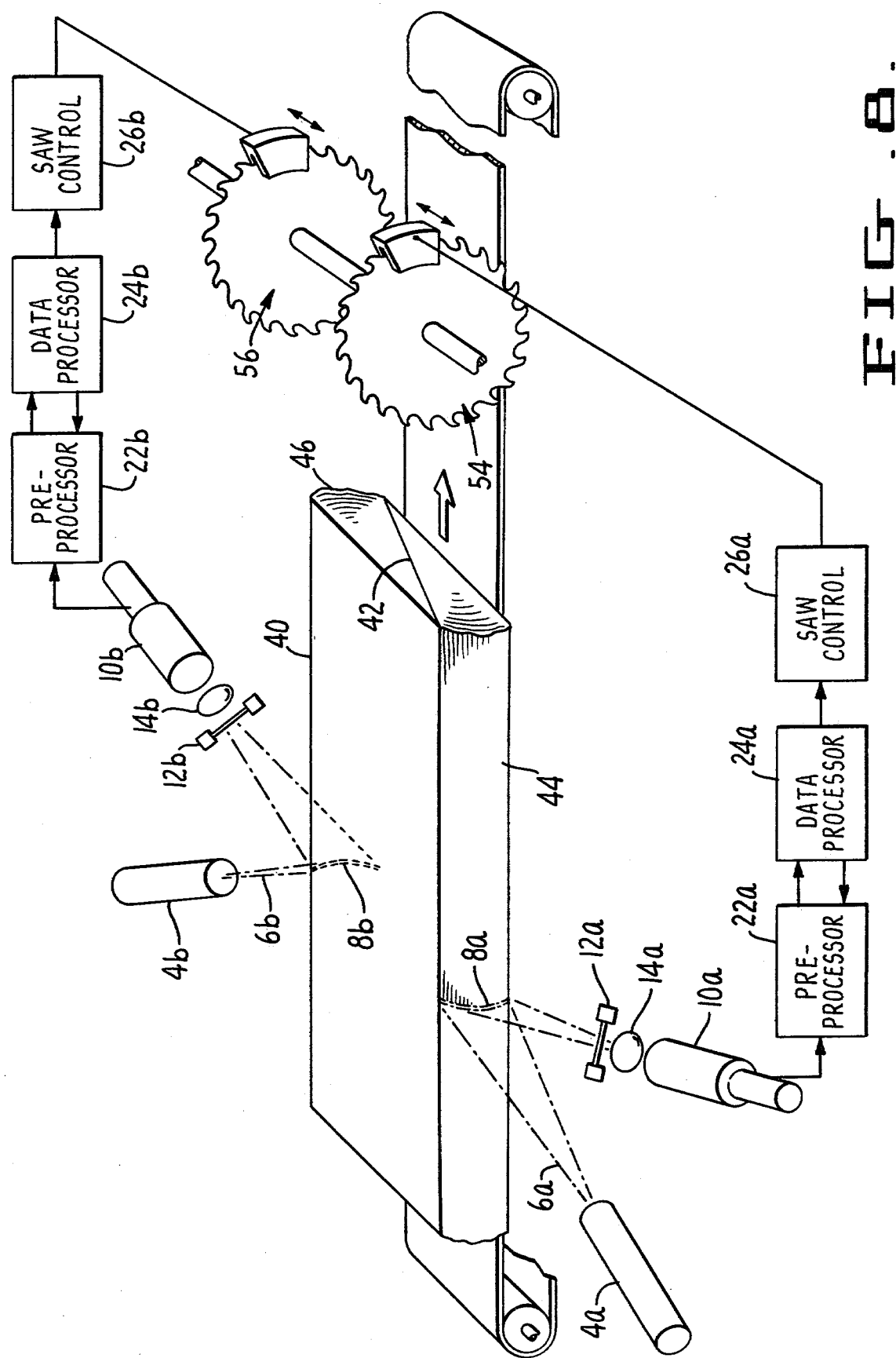
FIG. 8 is a diagrammatic perspective view of a further method of illuminating and detecting the illumination of a stationary or longitudinally moving workpiece, forming a part of the scanning operation in an automatic slant edger processing according to the present invention.

FIG. 8 shows a slant edger system forming part of a sector wood production system. Further details of a slant edger system into which the present invention may be incorporated is disclosed in commonly assigned co-pending application Ser. No. 645,742, filed Dec. 31, 1975 by Hasenwinkle et al. The application is incorporated herein by reference. In the manufacture of sector wood, a log is cut into sector-shaped pieces having preselected angles, the segments are inverted and glued together to form boards having two flat faces and two curved edges. By cutting the two curved edges at angles in a slant edger, so as to form a parallelogram when viewed on end, the boards may be glued together laterally to build up a board having a desired width dimension. In order to minimize wastage, the angle cuts made on the curved board edges by the slant edger must be optimally located to remove the least possible amount of wood. Further details of sector wood manufacture are set forth in U.S. Pat. No. 3,961,654 to Hasenwinkle, which is incorporated herein by reference.

Figure 11:
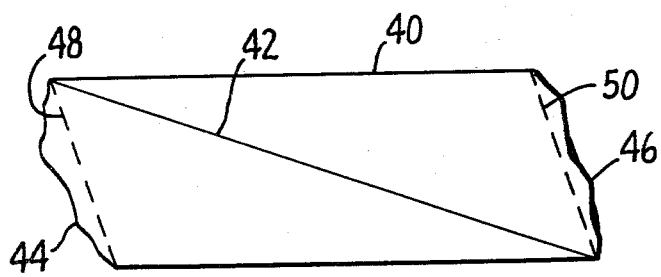
FIG. 11 is a cross-sectional view of board 40 of FIG. 8.

In FIG. 8, a board of the type just described (shown in cross section in FIG. 11) is transported past a pair of laser sources and camera detectors to a pair of slant edging saws 54 and 56 or other suitable wood machining devices such as chipping heads that are laterally movable, but fixed in angle, under the control of the system.

The elements 10a, 10b, 12a, 12b, of FIG. 8, correspond to the elements 10, 12, etc., respectively, of FIGS. 1 and 3, described above. A conveyor 52 transports board 40 past saws 54 and 56. Alternatively, blocks 22a and 24a can be time shared between the two cameras 10a and 10b.

Figure 9:
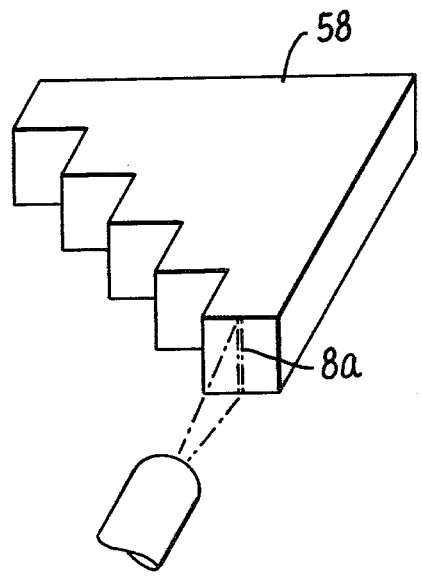
FIG. 9 is a perspective view of a further reference workpiece useful in calibrating the system of FIG. 3 when used as an automatic slant edger processing system.

FIGS. 9 and 10 show particular calibration fixtures 58 and 60, respectively, that are used to calibrate the system.

The data processors can be Nova 2/10 minicomputers or equivalent. The data processor outputs are lateral dimension commands to the saw controls 26a and 26b, respectively, causing the saw blades 54 and 56 to move laterally so as to cut in accordance with the data processors' computation of the optimum cutting position.

In order to calibrate the system, the calibration fixtures are placed into the field of view of each camera 10a and 10b, respectively. The description will proceed with respect to camera 10a, it being understood that the same procedure is used with respect to the system including the camera 10b.

Figure 12:
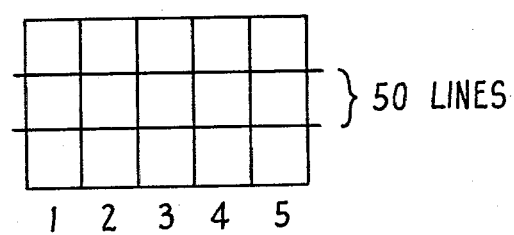
FIG. 12 is a diagrammatic view of a television raster scan showing the zonal calibration divisions of the field of view.

The particular software contemplates a zonal calibration broken into 5 parts horizontally and encompassing 50 horizontal television lines. A television raster scan divided in such a manner is shown in FIG. 12. The software also requires calibration as to the slant edger saw angle.

Figure 10A:
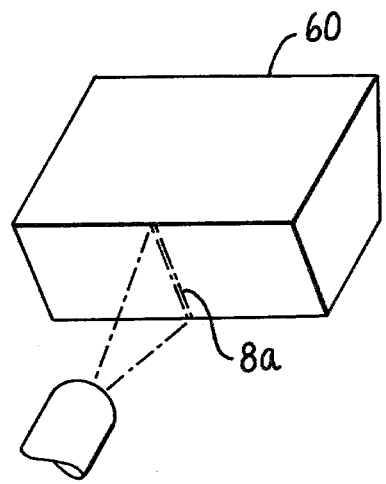
FIG. 10A is a perspective view of yet a further reference workpiece useful in calibrating the system of FIG. 3 when used as an automatic slant edger processing system.
Figure 10B:
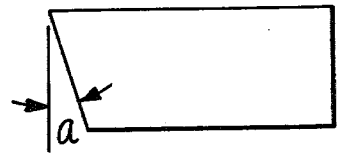
FIG. 10B is a side elevation view of the reference workpiece of FIG. 10A.

Saw angle calibration requires the fixture 60 of FIGS. 10a and 10b, where angle a is the saw angle. Zonal calibration requires fixture 58 of FIG. 9. To calibrate the system, fixture 60 is placed in the field of view of camera 10a in order to store the angle line in the data processor memory. The laser line 8a appears angled due to the angled face of fixture 60. Fixture 58 is placed in the field of view of camera 10a and must be moved so that the five successive steps of the face are scanned by the laser line 8a. The five steps will provide the five zones of calibration for each horizontal line. The exact dimensions of the fixture 58 are placed in the data processor memory and the horizontal line distance addresses from the preprocessor are assigned conversion factors linking them to true dimensions.

It will be apparent that the calibration technique described is acting only in a single dimension-horizontal, and that no vertical calibration is provided. However, those of ordinary skill in the art will appreciate that the vertical calibration can also be provided in accordance with the teachings herein.

In operation a board 40, formed from gluing two sector-shaped pieces along line 42, is scanned by laser 4a and camera 10a along face 44. It is desired to cut the edge along line 48 to minimize wastage. The software, acting on address points data along the laser intersection line first generates delta counts: the differences between the workpiece edge and the stored angle line of fixture 60. The smallest difference count is found and is converted to a reference point by translation at the saw angle in order that saw instructions always be based on the same reference point. The translated delta count is then converted to an absolute distance based on the dimensional value of counts in the particular zone of the field of view. That absolute distance is fed to the saw control 26a for controlling the lateral position of the saw.

In like manner, laser 4b and camera 10b scan the opposite face 46 of board 40 to control the lateral position of saw 56.

Figure 13B:
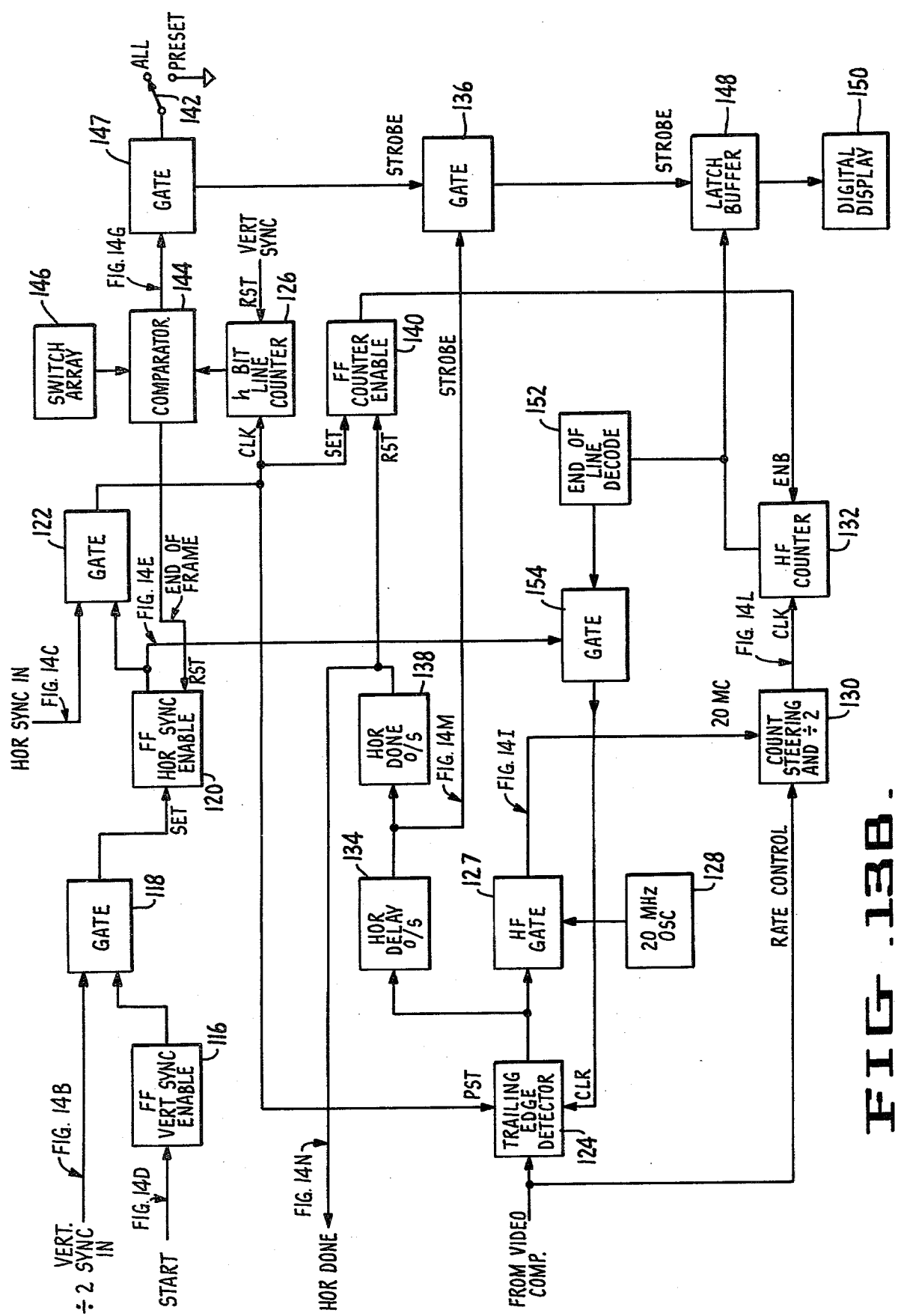
FIG. 13B is a block diagram of a further portion of the preprocessor of FIG. 3.
Figure 14:
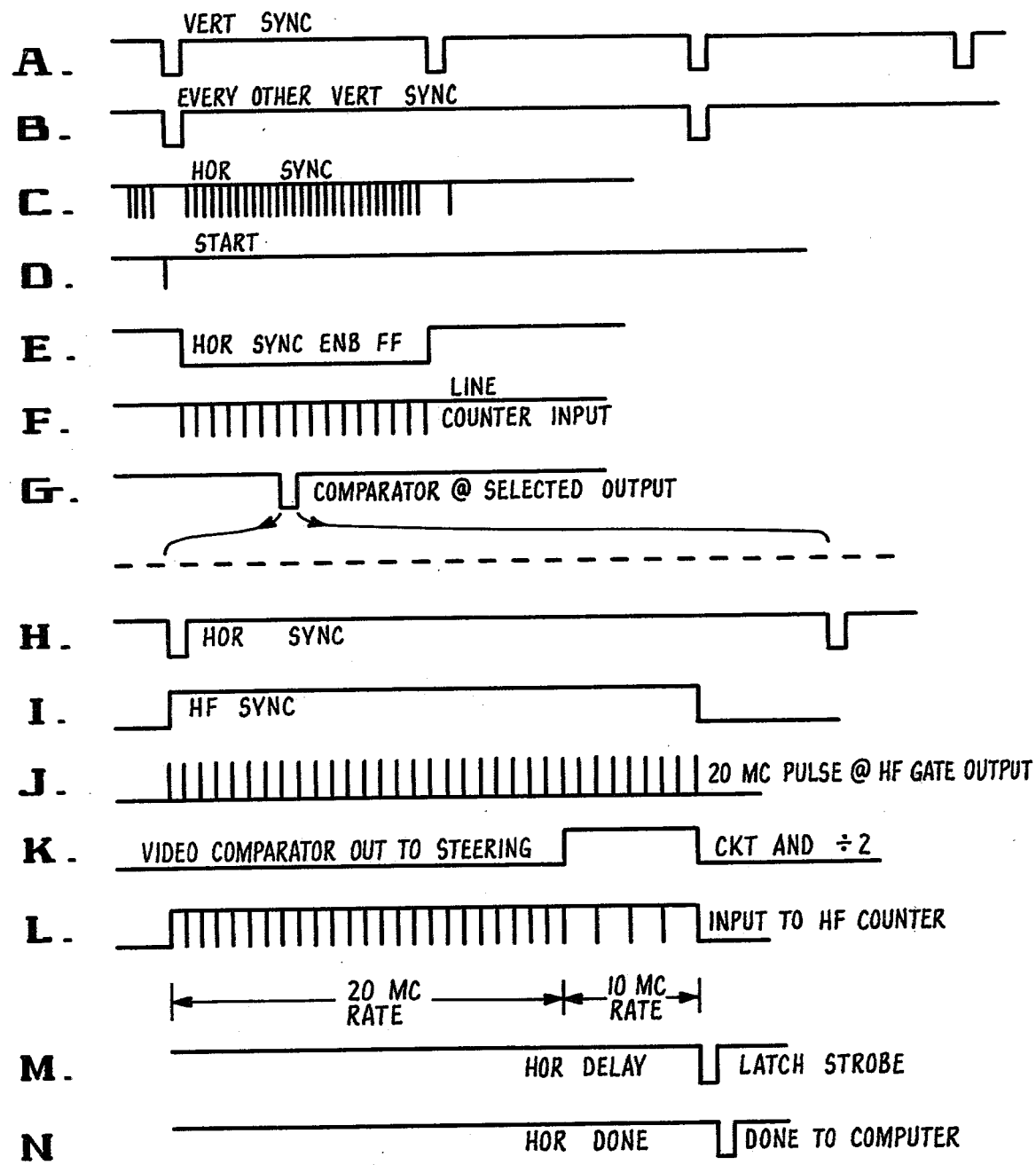
FIG. 14 is a waveform timing diagram useful in understanding the preprocessor of FIG. 13.

Details of the preprocessor 22 of FIG. 3 (also 22a and 22b of FIG. 8) are shown in FIG. 13. Certain waveforms occurring in FIGS. 13A and 13B are set forth in the timing diagram of FIG. 14.

An I/O RST (reset) signal from data processor 24 is applied to one-shot 102 which in turn sets all flip-flops and counters in the preprocessor to their initial conditions.

The scanning device 20 camera output is applied to a video buffer amplifier 104 which in turn has its output, the composite television signal, applied to horizontal and vertical sync strippers 106 and 108 which provide horizontal and vertical sync and to comparator circuit 107, which compares the composite video to rectified composite video derived through an operational rectifier 109. A threshold control 110 sets the amplitude at which a pulse edge causes an output from comparator 107.

Vertical sync from block 108 is applied to a divide-by-two block 112 and a one-shot 114 which provides a very narrow pulse having a leading edge coincident with the divided vertical sync. An external start signal, manually set, for example, will also trigger one-shot 114.

The start signal sets the vertical sync flip-flop 116 which in turn enables gate 118 to allow the next divided vertical sync pulse to set horizontal sync enable flip-flop 120 which enables gate 122 to pass horizontal sync to the preset (PST) input of trailing edge detector flip-flop 124 and to the clock input of n bit line counter 126. Thus, there is horizontal sync from gate 122 during every other vertical sync period when the start signal occurs.

Presetting edge detector flip-flop 124 enables HF (high frequency) gate 127. When gate 127 is enabled the signal from 20 MHz oscillators 128 is applied to count steering and divide by 2 block 130. In the absence of a signal from comparator 107 (i.e.—no pulse above the set amplitude), the 20 MHz signal is applied as the clock to HF counter 132 (preferably a ripple counter). When comparator 107 generates a pulse it changes block 130 to a divide by 2 thus providing a 10 MHz clock to counter 132.

At the trailing edge of the pulse from comparator 107, detector 124 changes state, disabling gate 127 and triggering one-shot 134 which in turn strobes gate 136. One-shot 134 also triggers a further one-shot 138 which sends a "horizontal done" signal to the data processor 24 and to the reset of counter enable flip-flop 140 which had been set by the horizontal sync pulse. Flip-flop 140 enables counter 132 between the horizontal sync pulse and the end of the counting period at the trailing edge of the detected pulse.

In normal operation when switch 142 is set to "all," comparator 144 and switch array 146 do not function and gate 136 is continuously strobed by gate 147, thereby strobing latch 148 which holds the count from counter 132 to the data processor 24 and to a digital display 150 (optional).

If it is desired to look at only one horizontal line instead of all, the number of the line is manually set in the switch array 146 and when that line number is reached in counter 126, the comparator 144 triggers gate 147 which strobes gate 136.

At the end of each frame, comparator 144 also resets flip-flop 120.

When counter 132 reaches a count indicating a line end, decoder 152 enables gate 154 to clear detector 124.

The preprocessor described uses only one field per television frame for simplicity.

The invention thus described provides for the continually accurate sensing of workpieces in a scanning system and the continually accurate processing of workpieces in a workpiece processing system. Although the invention has been described in the context of lumber mill operations, it will be understood that the invention is applicable to other types of automatic workpiece processing or automatic workpiece scanning. The invention is therefore to be limited only by the scope of the appended claims.

I claim:
1. A system for processing a workpiece comprising
   means having a field of view for scanning said workpiece in said field of view to generate signals related to the spatial coordinates of said workpiece,
   means for converting said signals to processing control signals, said converting means including means for modifying said signals to calibrate said scanning means,
   said means for modifying including memory means storing calibration information derived by comparing scanning signals of a known three dimensional reference piece located in said field of view with previously stored spatial coordinates of said known reference piece, and
   means for processing said workpiece in accordance with said processing control signals.

2. The combination of claim 1 wherein said means for scanning comprises
   means for directing a plane of detectable energy at an angle with respect to said workpiece, and
   means for detecting, at a different angle, the intersection line of said plane of detectable energy and said workpiece.

3. The combination of claim 2 wherein said means for scanning further comprises
   further means for directing a plane of detectable energy at an angle with respect to said workpiece, and
   further means for detecting, at a different angle, the intersection line of said plane of detectable energy and said workpiece.

4. The combination of claim 2 wherein said means for scanning further comprises means for transporting said workpiece relative to said means for directing and said means for detecting.

5. The combination of claim 2 wherein said means for detecting generates digital signals representing points of said intersection line.

6. The combination of claim 5 wherein said means for detecting comprises
   means for generating analog signals representing the field of view of said workpiece at said different angle, and
   means receiving said analog signals for generating digital signals representing points of said intersection line.

7. The combination of claim 6 wherein said calibration information includes a plurality of calibration factors relating, respectively, to zones of said field of view of said workpiece.

8. The combination of claim 2 wherein said calibration information includes a plurality of calibration factors relating, respectively, to zones of said field of view of said workpiece.

9. The combination of claim 2 wherein said means for directing comprises a collimated beam laser source and lens means for diverging said beam into a thin plate.

10. The combination of claim 9 wherein said means for detecting includes a television camera and band pass filter means centered at the frequency of said laser source.

11. The combination of claim 2 wherein said means for detecting includes a television camera.

12. The combination of claim 11 wherein said means for detecting includes means for counting at a first rate from the television horizontal sync pulse to the leading edge of a pulse representing said intersection line and for counting at a second rate from the leading edge of said pulse to the trailing edge of said pulse, whereby the pulse peak representing the position of said intersection line is determined.

13. The combination of claim 1 wherein the system is for processing a log or pieces cut from logs.

14. The combination of claim 13 wherein said means for processing includes means for sawing.

15. The combination of claim 13 wherein the system is a slant edger system.

16. The combination of claim 13 wherein the system is a slant edger system forming a part of a sector wood production system.

17. A method of processing a workpiece comprising
scanning said workpiece in a field of view to generate signals related to the dimensions of said workpiece,
storing calibration information derived by comparing scanning signals of a known three dimensional reference piece located in said field of view with previously stored spatial coordinates of said known reference piece,
modifying said signals with said stored calibration information,
converting said modified signals to processing control signals, and
processing said workpiece in accordance with said processing control signals.

18. A system for scanning a three-dimensional workpiece comprising
means having a field of view for scanning said workpiece in said field of view to generate signals related to the three-dimensional spatial coordinates of said workpiece, and
means for modifying said signals to calibrate said scanning means,
said means for modifying including memory means storing calibration information derived by comparing scanning signals of a known three-dimensional reference piece with previously stored three-dimensional spatial coordinates of said known reference piece.

19. The combination of claim 18 wherein said means for scanning comprises
means for directing a plane of detectable energy at an angle with respect to said workpiece, and
means for detecting, at a different angle, the intersection line of said plane of detectable energy and said workpiece.

20. The combination of claim 19 wherein said means for scanning further comprises
further means for directing a plane of detectable energy at an angle with respect to said workpiece, and
further means for detecting, at a different angle, the intersection line of said plane of detectable energy and said workpiece.

21. The combination of claim 19 wherein said means for scanning further comprises means for transporting said workpiece relative to said means for directing and said means for detecting.

22. The combination of claim 19 wherein said means for detecting generates digital signals representing points of said intersection line.

23. The combination of claim 22 wherein said means for detecting comprises
means for generating analog signals representing the field of view of said workpiece at said different angle, and
means receiving said analog signals for generating digital signals representing points of said intersection line.

24. The combination of claim 23 wherein said calibration information includes a plurality of calibration factors relating, respectively, to zones of said field of view of said workpiece.

25. The combination of claim 18 wherein said calibration information includes a plurality of calibration factors relating, respectively, to zones of said field of view of said workpiece.

26. A method of scanning a workpiece comprising
scanning said workpiece in a field of view to generate signals related to the dimensions of said workpiece,
storing calibration information derived by comparing scanning signals of a known three dimensional reference piece located in said field of view with previously stored spatial coordinates of said known reference piece,
modifying said workpiece signals with said stored calibration information.

* * * * *